United States Patent

Nakai

(10) Patent No.: US 11,215,227 B2
(45) Date of Patent: Jan. 4, 2022

(54) SLIDING MEMBER

(71) Applicant: DAIDO METAL COMPANY LTD., Nagoya (JP)

(72) Inventor: Masahiro Nakai, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 16/931,704

(22) Filed: Jul. 17, 2020

(65) Prior Publication Data

US 2021/0025451 A1  Jan. 28, 2021

(30) Foreign Application Priority Data

Jul. 22, 2019 (JP) .............................. JP2019-134393

(51) Int. Cl.

| | |
|---|---|
| *F16C 33/12* | (2006.01) |
| *B32B 15/01* | (2006.01) |
| *C22C 9/00* | (2006.01) |
| *C22C 9/02* | (2006.01) |
| *B22D 19/08* | (2006.01) |

(Continued)

(52) U.S. Cl.

CPC .......... *F16C 33/121* (2013.01); *B32B 15/015* (2013.01); *C22C 9/00* (2013.01); *B22D 13/02* (2013.01); *B22D 19/0081* (2013.01); *B22D 19/085* (2013.01); *B32B 2311/12* (2013.01); *B32B 2311/30* (2013.01); *C22C 9/02* (2013.01); *F16C 33/125* (2013.01); *F16C 2204/12* (2013.01); *F16C 2240/90* (2013.01); *F16C 2360/22* (2013.01)

(58) Field of Classification Search

CPC .. F16C 33/121; F16C 2204/12; F16C 33/125; F16C 2360/22; B32B 15/015; B32B 2311/12; B32B 2311/30; C22C 9/00; C22C 9/02; B22D 19/0081; B22D 19/085; B22D 13/02

USPC ....................................................... 384/129

See application file for complete search history.

(56) References Cited

U.S. PATENT DOCUMENTS

| | | | | |
|---|---|---|---|---|
| 5,429,876 | A * | 7/1995 | Tanaka ................... | B32B 15/015 428/553 |
| 5,684,797 | A * | 11/1997 | Aznar .................... | H04L 49/201 370/390 |
| 6,159,348 | A * | 12/2000 | Barnsby .................. | F16H 57/08 204/192.15 |

FOREIGN PATENT DOCUMENTS

| | | | |
|---|---|---|---|
| CN | 108913854 A | * | 11/2018 |
| JP | H06-322462 A |  | 11/1994 |

(Continued)

*Primary Examiner* — Humera N. Sheikh
*Assistant Examiner* — John D Schneible
(74) *Attorney, Agent, or Firm* — Snyder, Clark, Lesch & Chung, LLP

(57) ABSTRACT

A sliding member includes a back-metal layer including an Fe alloy and a sliding layer including a copper alloy including 0.5 to 12 mass % of Sn and the balance of Cu and inevitable impurities. A cross-sectional structure of the sliding layer includes first copper alloy grains in contact with a bonding surface and second copper alloy grains not in contact with the bonding surface. The first and second grains have an average grain size D1 and D2 respectively. D1 is 30 to 80 μm; and D1/D2=0.1 to 0.3. In the cross-sectional structure, the second grains includes third grains that includes internal grains therein that are not in contact with a grain boundary of the third grains. A total area S1 of the third grains and a total area of the second copper alloy grains S2 satisfy: S0/S2=0.25 to 0.80.

7 Claims, 2 Drawing Sheets

(51) Int. Cl.
*B22D 19/00* (2006.01)
*B22D 13/02* (2006.01)

(56) References Cited

FOREIGN PATENT DOCUMENTS

| | | | |
|---|---|---|---|
| JP | H09-100882 A | | 4/1997 |
| JP | 2006-22896 A | | 1/2006 |
| JP | 2012031935 A | * | 2/2012 |

* cited by examiner

SLIDING MEMBER

TECHNICAL FIELD

The present invention relates to a sliding member, for example for a bearing used in internal combustion engines or automatic transmissions, or a bearing used in various machines. Specifically, the present invention relates to a sliding member including a sliding layer on a back-metal layer.

BACKGROUND ART

A cylindrical or semi-cylindrical sliding bearing formed of a sliding member including a sliding layer of a copper alloy and a steel back-metal layer has been used for a bearing device of an internal combustion engine, an automatic transmission, or the like. For example, JP 6-322462A and JP 2006-22896A describe a sliding member including a sliding layer made of a copper alloy. In such a sliding member, the sliding layer made of a copper alloy achieves seizure resistance and wear resistance as well as sliding properties, while the back-metal layer functions as a support of the copper alloy and imparts strength to the sliding member. JP 6-322462A and JP 2006-22896A describe a sliding member formed through a sintering process, and JP 9-100882A (paragraph [0031]) describes a sliding member including a sliding layer made of a copper alloy and formed on an inner surface of a cylindrical back-metal layer by a casting process.

SUMMARY OF THE INVENTION

When the internal combustion engine or the automatic transmission starts to operate, a sliding surface of the sliding member is in direct contact with a counter shaft member. Thus, when a bearing device starts the operation and slides against the counter shaft member, the sliding surface of the sliding member is in direct contact with the counter shaft member. During a period from the moment when the counter shaft member starts to move (i.e. rotate) until the time when the sliding member and the counter shaft member are in a dynamic friction state (i.e. a state in which the sliding surface of the sliding member slides against the counter shaft member), a large external force is applied from the counter shaft member to the sliding layer of the sliding member in a moving direction (or a sliding direction) of the counter shaft member, thereby causing elastic deformation of the sliding layer. When the elastic deformation of the sliding layer becomes larger under such a situation, a conventional sliding member which includes a sliding layer of a copper alloy on a back-metal layer is, in some cases, subjected to shear failure at an interface between the sliding layer and the back-metal layer or damages such as cracks on a sliding surface.

An object of the present invention is to provide a sliding member that is less likely to be subjected to shear failure between the sliding layer and the back-metal layer and has improved bonding between a sliding layer and a back-metal layer and damages such as cracks on the sliding surface than in a conventional sliding member According to an aspect of the present invention, provided is a sliding member including: a back-metal layer having a back surface and a bonding surface; and a sliding layer on the bonding surface of the back-metal layer. The back-metal layer includes an Fe alloy, and the sliding layer includes a copper alloy including 0.5 to 12 mass % of Sn and the balance of Cu and inevitable impurities. The sliding layer has a cross-sectional structure perpendicular to a sliding surface of the sliding layer. The cross-sectional structure includes first copper alloy grains that are in contact with the bonding surface of the back-metal layer and second copper alloy grains that are not in contact with the bonding surface. The first copper alloy grains has an average grain size $D1$ and the second copper alloy grains has an average grain size $D2$, and $D1$ and $D2$ satisfy the following relations:

$D1$ is 30 to 80 μm; and $D1/D2 = 0.1$ to $0.3$.

In the cross-sectional structure, the second copper alloy grains comprise third grains that include internal grains therein that are not in contact with a grain boundary of the third grains. A total area $S0$ of the third grains and a total area $S2$ of the second copper alloy grains satisfy the following relation:

$S0/S2 = 0.25$ to $0.80$.

According to an embodiment of the present invention, the second copper alloy grains are preferably columnar crystals. According to an embodiment of the present invention, the first copper alloy grains are also preferably columnar crystals.

According to an embodiment of the present invention, the average grain size $D1$ of the first copper alloy grains is preferably 40 to 80 μm.

According to an embodiment of the present invention, an average thickness $T1$ of a group of the first copper alloy grains is preferably 3 to 8% of a thickness $T$ of the sliding layer.

According to an embodiment of the present invention, the thickness $T$ of the sliding layer is preferably 0.4 to 2.0 mm.

According to an embodiment of the present invention, the copper alloy of the sliding layer preferably further includes one or more elements selected from 0.01 to 0.2 mass % of P, 0.1 to 15 mass % of Ni, 0.5 to 10 mass % of Fe, 0.01 to 5 mass % of Al, 0.01 to 5 mass % of Si, 0.1 to 5 mass % of Mn, 0.1 to 10 mass % of Zn, 0.1 to 5 mass % of Sb, 0.1 to 5 mass % of In, 0.1 to 5 mass % of Ag, 0.5 to 25 mass % of Pb, and 0.5 to 20 mass % of Bi.

According to an embodiment of the present invention, the back-metal layer preferably includes 0.07 to 0.35 mass % of C, not more than 0.4 mass % of Si, not more than 1 mass % of Mn, not more than 0.04 mass % of P, not more than 0.05 mass % of S, and the balance of Fe and inevitable impurities.

In the sliding member of the present invention, shear failure is less likely to occur at a bonding interface between the sliding layer and the back-metal layer, leading to stronger bonding between the back-metal layer and the sliding layer and less occurrence of damages such as cracks on the sliding surface.

Other objects, features and advantages of the invention will become apparent from the following description of the embodiments of the invention taken in conjunction with the accompanying drawings.

DESCRIPTION OF THE EMBODIMENTS

Figure 1:
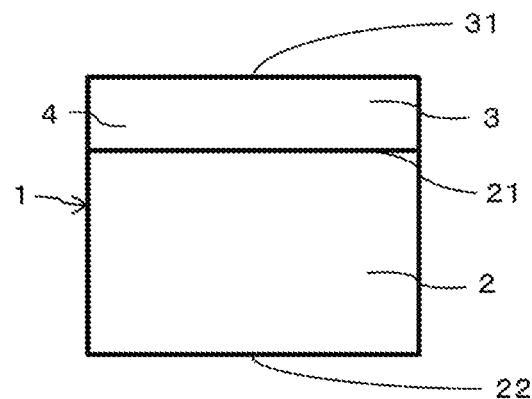
FIG. 1 is a schematic diagram of a cross section of an embodiment of a sliding member according to the present invention.

In general, a sliding member includes a sliding layer including a copper alloy and formed on one surface of a back-metal layer. The back-metal layer typically includes hypoeutectoid steel including 0.07 to 0.35 mass % of carbon, stainless steel, or the like. The copper alloy of the sliding layer typically includes 1 to 12% of Sn, and has a structure including a large number of copper alloy grains.

In the conventional sliding member, the copper alloy grains have an approximately uniform shape and grain size throughout a thickness direction of the sliding layer. Thus, the sliding layer has approximately uniform deformation resistance against an external force throughout the thickness direction of the sliding layer. In such a conventional sliding member, when operation of a bearing device starts and a sliding surface of the sliding member slides against a counter shaft member while it is in direct contact with the counter shaft member, a large external force is applied from the counter shaft member to the sliding layer in a moving direction (sliding direction) of the counter shaft member during a period from the moment when the movement (rotation) of the counter shaft member starts until the time when the sliding member and the counter shaft member are shifted to a dynamic friction state. Thus, elastic deformation of the sliding layer is caused. Since the back-metal layer has high strength and high deformation resistance as compared with the copper alloy of the sliding layer, a large difference in the elastic deformation generates between the back-metal layer and the sliding layer at their interface when an amount of elastic deformation of the sliding layer becomes larger. Thus, shear failure is more likely to generate between the back-metal layer and the sliding layer. Also, a large amount of elastic deformation of the sliding layer causes cracking due to fatigue or the like at a grain boundary in the sliding layer, and cracking is more likely to occur on the surface of the sliding layer. The present invention addresses such a problem of the conventional sliding member.

An embodiment of a sliding member 1 according to the present invention is described below with reference to FIGS. 1 to 3. FIG. 3 is a perspective view showing an embodiment of the sliding member 1 according to the present invention. The sliding member 1 has a cylindrical shape, and includes a back-metal layer 2 on an outer side and a sliding layer 3 including a copper alloy 4 on an inner side. The sliding member 1 may have other shapes such as a semi-cylindrical shape or a partially cylindrical shape.

FIG. 1 is a schematic diagram showing a cross section of the sliding member 1 of the present invention. The back-metal layer 2 has a back surface 22 and a bonding surface 21, and the sliding layer 3 is formed on the bonding surface 21. The sliding layer 3 has an interface with the back-metal layer 2, and has a sliding surface 31 on a side opposite to the interface. A material of the back-metal layer 2 is not particularly limited, but may be, for example, an Fe alloy including 0.07 to 0.35 mass % of carbon, stainless steel, or the like. For example, the back-metal layer 2 may have a composition including 0.07 to 0.35 mass % of carbon, and one or more elements of not more than 0.4 mass % of Si, not more than 1 mass % of Mn, not more than 0.04 mass % of P, and not more than 0.05 mass % of S, and the balance of Fe and inevitable impurities. In some cases, a small amount of Cu element of the copper alloy diffuses and solid-solved in a ferrite phase in the vicinity of the bonding surface 21 of the back-metal layer 2 in a casting process (described later). The back-metal layer 2 may further include such copper element other than the above composition.

The copper alloy 4 of the sliding layer 3 may have a composition, for example, including 0.5 to 12 mass % of Sn and the balance of Cu and inevitable impurities. Sn is an element that increases strength of the copper alloy. If the copper alloy includes less amount of Sn than the lower limit value, the effect of Sn is insufficient. If the amount of Sn included in the copper alloy is more than the upper limit value, the copper alloy becomes brittle.

The copper alloy 4 may, for example, include 0.5 to 12 mass % of Sn, and one or more elements selected from 0.01 to 0.2 mass % of P, 0.1 to 15 mass % of Ni, 0.5 to 10 mass % of Fe, 0.01 to 5 mass % of Al, 0.01 to 5 mass % of Si, 0.1 to 5 mass % of Mn, 0.1 to 10 mass % of Zn, 0.1 to 5 mass % of Sb, 0.1 to 5 mass % of In, 0.1 to 5 mass % of Ag, 0.5 to 25 mass % of Pb, 0.5 to 20 mass % of Bi, and the balance of Cu and inevitable impurities. When the copper alloy 4 includes two or more of these selected elements, a total amount of the elements is preferably not more than 40 mass %.

P, Ni, Fe, Al, Si, Mn, Zn, Sb, In and Ag increase strength of the copper alloy 4. If the amounts of these elements included in the copper alloy 4 are less than the lower limit value, the effect of these elements is insufficient, and if the amounts of these elements included in the copper alloy 4 are more than the upper limit value, the copper alloy 4 becomes brittle. When a copper alloy including the amounts of Al and Zn more than the upper limit value is formed by a casting process on a back-metal layer of an Fe alloy, a layered brittle reaction phase (a phase including Fe as a main component, Cu of the copper alloy, and Al or Zn) is formed on the entire bonding surface of the back-metal layer bonded to the copper alloy. In a case where such a brittle reaction phase is formed on the bonding surface of the back-metal layer, an external force (i.e., a large external force generated at the start of the sliding described above) applied to the copper alloy of the sliding layer of the sliding member will generate cracking in the brittle reaction phase and thus shear failure is more likely to occur between the sliding layer and the back-metal layer. Pb and Bi are elements that increase lubricating properties of the copper alloy 4. If the amounts of Pb and Bi included in the copper alloy 4 are less than the lower limit value, the effect of Pb and Bi is insufficient, and if the amounts of Pb and Bi included in the copper alloy 4 are more than the upper limit value, the copper alloy 4 is brittle. Sn and the selected elements of the copper alloy 4 are almost uniformly included in the entire copper alloy 4 of the sliding layer 3, and there is no difference in concentration of these elements between (later defined) interface grains 41 and non-interface grains 42.

Figure 2:
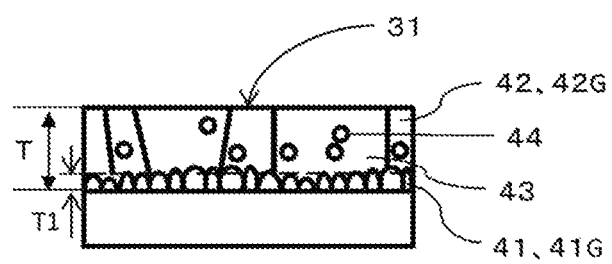
FIG. 2 is a schematic diagram of a cross-sectional structure of a sliding layer shown in FIG. 1.
Figure 3:
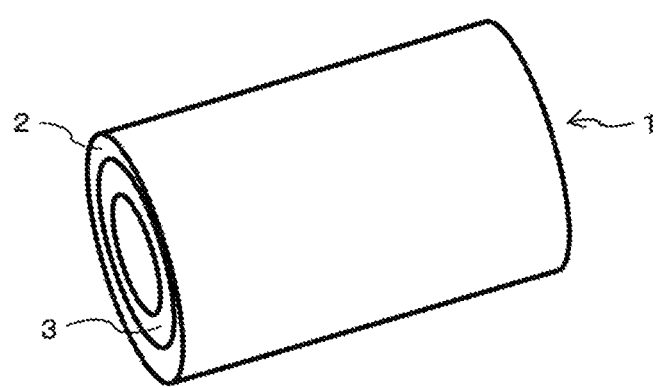
FIG. 3 is a perspective view of an embodiment of the sliding member according to the present invention.

FIG. 2 shows a cross-sectional structure perpendicular to the sliding surface 31 of the sliding layer 3 shown in FIG. 1 (hereinafter, the cross section perpendicular to the sliding surface 31 of the sliding layer 3 is simply referred to as "cross section"). The structure of the copper alloy 4 constituting the sliding layer 3 includes a large number of copper alloy grains. The copper alloy grains include grains 41 that are in contact with the bonding surface 21 of the back-metal layer 2 (hereinafter referred to as "interface grains") and grains 42 that are not in contact with the bonding surface 21 of the back-metal layer 2 (hereinafter referred to as "non-interface grains"). In the present invention, an average grain size D1 of the interface grains 41 is 10 to 30% of an average grain size D2 of the non-interface grains 42 (D1/D2=0.1 to 0.3). Thus, in a region composed of the interface grains 41 (hereinafter referred to as "interface grain group 41G"), deformation resistance to external force is larger than in a region composed of the non-interface grains 42 (hereinafter referred to as "non-interface grain group 42G") due to Hall-Petch effect.

In the cross-sectional structure of the copper alloy 4 constituting the sliding layer 3, the non-interface grains 42 include copper alloy grains (hereinafter referred to as "internal-crystal-inclusive grains 43") including other grains (hereinafter referred to as "internal crystals 44") that are apart from a grain boundary of the internal-crystal-inclusive grains 43. That is, in cross-sectional view of the copper alloy 4, the internal crystals 44 are grains that are present within the internal-crystal-inclusive grains 43 and are not in contact with the grain boundary of the internal-crystal-inclusive grains 43. An area ratio of the internal-crystal-inclusive grains 43 to the non-interface grain group 42G is 25 to 80%. That is, when S2 represents a total area of the non-interface grains 42, and S0 (hereinafter, S0 includes an area of the internal crystals 44) represents a total area of the internal-crystal-inclusive grains 43, a ratio S0/S2 is 0.25 to 0.80.

In the present invention, the non-interface grains 42 are preferably columnar crystals. As described below, it is advantageous for forming the internal-crystal-inclusive grains 43 that the columnar crystals grow in different directions. However, in that case, at least some of the non-interface grains 42 may not necessarily be columnar crystals. Furthermore, in the present invention, the interface grains 41 are also preferably columnar crystals. This is because the interface grains 41 composed of columnar crystals are advantageous for growth of the non-interface grains 42 in different directions. Also in that case, at least some of the interface grains 41 may not necessarily be columnar crystals. FIG. 2 shows a case where the interface grains 41 and the non-interface grains 42 are both columnar crystals.

With this configuration, following effects are obtained. Even if when operation of a bearing device starts and an external force is applied from a counter shaft member to the sliding layer 3 to cause elastic deformation of the sliding layer 3 during a period from the moment when rotational movement of the counter shaft member starts until the time when the sliding member and the counter shaft member are shifted to the dynamic friction state, a large amount of elastic deformation occurs in the non-interface grain group 42G having relatively low deformation resistance, but the external force is less likely to be applied to the interface grain group 41G. Furthermore, due to high deformation resistance and a small amount of elastic deformation of the interface grain group 41G, a difference in the amount of elastic deformation between the back-metal layer 2 and the copper alloy 4 is small on the bonding surface 21, and thus shear failure is less likely to occur on the bonding surface 21, leading to stronger bonding between the back-metal layer 2 and the copper alloy 4 of the sliding layer 3.

If the average grain size D1 of the interface grains 41 is more than 30% of the average grain size D2 of the non-interface grains 42, difference in deformation resistance between the interface grain group 41G and the non-interface grain group 42G is small, and thus the above effect is insufficient. On the other hand, if the average grain size D1 of the interface grains 41 is less than 10% of the average grain size D2 of the non-interface grains 42, difference in deformation resistance between the interface grain group 41G and the non-interface grain group 42G is excessively large, and thus cracking may occur between the interface grain group 41G and the non-interface grain group 42G when an external force is applied to the sliding layer.

The average grain size D1 of the interface grains 41 is preferably 30 to 80 μm, and more preferably 40 to 80 μm. Since the interface grains 41 have a smaller average grain size D1, the interface grain group 41G in contact with the bonding surface 21 of the back-metal layer 2 has higher deformation resistance. However, if the interface grains 41 have an average grain size D1 of less than 30 μm, ductility becomes excessively low, and thus cracking (or fatigue) may occur at a grain boundary when a large external force is applied to the sliding layer 3. On the other hand, if the average grain size D1 exceeds the upper limit value, the interface grain group 41G in contact with the bonding surface 21 of the back-metal layer 2 has small deformation resistance, and the effect of preventing the occurrence of shear failure is less likely to be achieved.

In addition to the above effect, according to the present invention, the internal-crystal-inclusive grains 43 among the non-interface grains 42 prevent excessive elastic deformation of the entire non-interface grain group 42G, and damages such as cracks on the sliding surface is less likely to occur. This is because the internal crystals 44 and crystals surrounding the internal crystals 44 have different crystal orientations in the internal-crystal-inclusive grains 43, and thus the internal crystals 44 serve as deformation resistance, thereby preventing the excessive elastic deformation in the sliding direction despite a large grain size of the non-interface grain group 42G.

A ratio (S0/S2) of the total area S0 of the internal-crystal-inclusive grains 43 to the area S2 of the non-interface grain group 42G is preferably 25 to 80%. The ratio (S0/S2) is more preferably 40 to 80%. If the ratio is less than 25%, the elastic deformation cannot be prevented, and the effect of preventing the occurrence of damages such as cracks on the sliding surface is less likely to be achieved. When the ratio is e.g. 40%, the effect of preventing the elastic deformation is enhanced. On the other hand, if the area ratio is more than 80%, difference in deformation resistance between the interface grain group 41G and the non-interface grain group 42G is small, and the above effect of preventing the occurrence of shear is insufficient.

Next, a method of measuring the average grain size D1 of the interface grains 41 and the average grain size D2 of the non-interface grains 42 will be described.

First, a plurality of portions (e.g., 5 portions) of a cross section cut in a thickness direction of the sliding member 1 (i.e., a direction perpendicular to the sliding surface 31) are observed with use of an FE-SEM (field emission scanning electron microscope) (e.g., JIB-4600F manufactured by JEOL Ltd.) including an EBSD (electron backscatter diffraction) analysis system. Then, a crystal orientation angle of the copper alloy is analyzed, and images (e.g., at a magnification of 200 times) showing a grain boundary of the copper alloy grains are obtained. The grain boundary of the copper alloy grains is determined by an inclination angle of not less than 15°.

Subsequently, the interface grains 41 and the non-interface grains 42 in the images are distinguished from each other with use of a general image analysis method (e.g., analysis software: Image-Pro Plus (Version 4.5) manufactured by Planetron, Inc.), and an area of each of the interface grains 41 is measured. Then, a diameter of a circle having an area equal to the area of each of the interface grains 41 (equivalent circle diameter) is calculated, and he average grain size D1 is calculated. In a similar manner, the average grain size D2 of the non-interface grains 42 is obtained. The magnification of the images is not limited to 200 times, and may be changed to other magnifications.

Next, a method of measuring the area ratio (S0/S2) will be described.

First, as the measuring of the average grain size D1 of the interface grains 41 and the average grain size D2 of the non-interface grains 42, a plurality of portions (e.g., 5 portions) of a cross section cut in the thickness direction of the sliding member 1 (i.e., the direction perpendicular to the sliding surface 31) are observed with use of an FE-SEM (field emission scanning electron microscope) (e.g., JIB-4600F manufactured by JEOL Ltd.) including an EBSD (electron backscatter diffraction) analysis system. Then, a crystal orientation angle of the copper alloy is analyzed, and images (e.g., at a magnification of 200 times) showing a grain boundary of the copper alloy grains are obtained. The grain boundary of the copper alloy grains is determined by an inclination angle of not less than 15°.

Subsequently, with use of a general image analysis method (e.g., analysis software: Image-Pro Plus (Version 4.5) manufactured by Planetron, Inc.) for the images, the interface grains 41, the non-interface grains 42 that are not in contact with the bonding surface 21 of the back-metal layer 2, and the internal-crystal-inclusive grains 43 including the internal crystals 44 in the non-interface grains 42 are distinguished from each other, and then a total area (S2) of the non-interface grains 42 and an area (S0) of the internal-crystal-inclusive grains 43 are measured. From the total area (S2) and the area (S0), the area ratio S0/S2 is obtained. The magnification of the images is not limited to 200 times, and may be changed to other magnifications. In some cases, a granular intermetallic compound including Sn, the selected elements, or the like mentioned above is formed (deposited) at the grain boundary of the grains in the copper alloy 4. As well, a granular Bi or Pb phase e is formed (deposited) in some cases at the grain boundary of the copper alloy grains. However, the intermetallic compound grains, the Bi phase, the Pb phase, and the like are not taken into consideration in the measurement of the average grain sizes D1 and D2.

An average thickness T1 of the interface grain group 41G is defined as an average length of the interface grain group 41G in a direction from the bonding surface 21 toward the sliding surface 31. The average thickness T1 of the interface grain group 41G is preferably 3 to 8% of a thickness T of the sliding layer (T1/T=0.03 to 0.08).

If the average thickness T1 of the interface grain group 41G is less than the lower limit value, a large external force applied to the surface of the sliding layer 3 may be transmitted to a portion of the interface grain group 41G in the vicinity of the bonding surface 21 of the back-metal layer 2. If the average thickness T1 of the interface grain group 41G is more than the upper limit value, the non-interface grain group 42G has an excessively small thickness ratio, and thus the effect of mitigating the external force may be insufficient. The thickness T of the sliding layer 3 is preferably 0.3 to 3.0 mm, and more preferably 0.3 to 2.0 mm.

The average thickness of the interface grain group 41G can be obtained from the images with use of the image analysis method. An average length is measured thereby in the thickness direction from the bonding surface 21 of the back-metal layer 2 to a boundary (line) between the interface grain group 41G and the non-interface grain group 42G. The thickness T of the sliding layer 3 can also be confirmed, from the images and measuring with use of the image analysis method, as an average length in the thickness direction from the bonding surface 21 of the back-metal layer 2 to the sliding surface 31.

The sliding member of the present invention may include, on the surface of the sliding layer and/or the surface of back-metal layer, a coating layer of Sn, Bi or Pb or an alloys based on these metals, or a coating layer of a synthetic resin or based on a synthetic resin. (In this case, the surface of the sliding layer is herein referred to as "sliding surface").

A method of producing a sliding member according to the present embodiment will be described below.

First, a cylindrical member of an Fe alloy to be formed into a back-metal layer and a molten copper alloy to be formed into a sliding layer are prepared. The molten copper alloy is maintained at a temperature higher by approximately 50° C. to 150° C. than a melting point (liquidus temperature) of the copper alloy. The cylindrical member is heated and maintained at a temperature in the range from approximately the same temperature as the temperature of the molten copper alloy to be cast (poured) into the cylindrical member to a temperature lower by 50° C. than the temperature of the molten copper alloy. In order to prevent oxidation of the cylindrical member during heating, flux may be applied in advance to at least an inner surface (to be bonded with the copper alloy of the sliding layer) or the entire surface of the cylindrical member.

Figure 5:
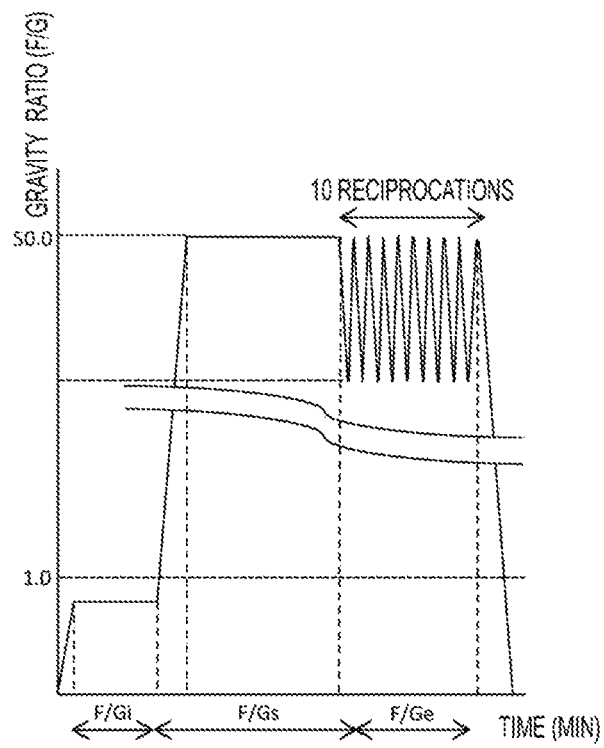
FIG. 5 shows an example of manufacturing condition of the sliding member according to the invention.

The prepared cylindrical member is mounted to a centrifugal casting device, and the molten copper alloy at the above temperature is poured onto the inner surface of the cylindrical member, and then the cylindrical member is rotated around an axis of the cylindrical member. As shown in FIG. 5, immediately after the poring of the molten copper alloy, a rotational speed of the cylindrical member is set so that a ratio (centrifugal force/gravity) between centrifugal force F and gravity G applied to the molten copper alloy is 0.8 to 0.9 (hereinafter referred to as "initial gravity ratio F/Gi"), and after 1 to 5 seconds, the rotational speed is increased so that the ratio of the centrifugal force to the gravity is 50.0 to 60.0 (hereinafter referred to as "reference gravity ratio F/Gs"). An amount of the molten copper alloy poured into the cylindrical member is not less than 10 times and not more than 25 times an amount required to form a sliding layer having the thickness T of the sliding member. After the rotational speed of the cylindrical member is increased so that the gravity ratio reaches the reference gravity ratio F/Gs, cooling water is sprayed to an outer diameter surface side of the cylindrical member to cool the cylindrical member. Subsequently, while the molten copper alloy is at a temperature of lower than the liquidus temperature and not lower than a solidus temperature, the rotational speed is changed so that the ratio of the centrifugal force to the gravity is varied 3 to 10 times between 40 to 70% of the reference gravity ratio F/Gs (hereinafter referred to as "end gravity ratio F/Ge") and the reference gravity ratio F/Gs. When the molten copper alloy reaches a temperature of not higher than approximately 400° C., the rotation and cooling of the cylindrical member are stopped, and the cylindrical member is removed from the centrifugal casting device. The time from the start of the water cooling until the molten copper alloy is solidified is approximately 20 to 40 seconds.

After the removal of the cylindrical member from the centrifugal casting device, the cylindrical member is allowed to be cooled to a room temperature in an air atmosphere or forced to be cooled to a room temperature by water cooling or the like. On the inner surface of the cylindrical member after cooling, a copper alloy layer is formed, and the copper alloy layer has a thickness approximately 10 to 25 times the thickness T of the sliding layer required to constitute the sliding member.

In a conventional manufacturing method of a sliding member through a centrifugal casting method, an amount of molten copper alloy poured into a sliding cylindrical member is approximately 1.2 to 2 times an amount required to form a sliding layer 3 having the thickness T of the sliding member. Thus, a copper alloy layer is formed on an inner surface side of the cylindrical member after cooling, and the copper alloy layer has a thickness approximately 1.2 to 2 times the thickness T of the sliding layer required to constitute the sliding member. The conventional copper alloy manufactured in this manner has a cross-sectional structure that generally includes a chill crystal portion of the copper alloy on a bonding interface of a back-metal layer, a columnar crystal portion above the chill crystal portion, and an equiaxed crystal portion above the columnar crystal portion. The chill crystal portion is formed as a thin film on the bonding interface of the back-metal layer (i.e. cylindrical member). For example, when a copper alloy layer having a thickness of approximately 1 mm is formed, the chill crystal portion has a thickness approximately 1% (0.01 mm) of the thickness of the copper alloy layer. Copper alloy grains of the chill crystal portion have an excessively small average grain size (an average grain size of not more than 1 μm), and thus the copper alloy grains of the chill crystal portion have high strength but are excessively brittle. Thus, during sliding of a sliding surface of the sliding member with a counter shaft member, shear failure is more likely to occur between the chill crystal portion and the bonding interface of the back-metal layer or between the chill crystal portion and the columnar crystal portion when an external force is applied to the copper alloy of the sliding layer.

In the conventional manufacturing method, simultaneously with the pouring of the molten copper alloy onto the inner surface of the cylindrical member (back metal), the molten copper alloy coming into contact with the inner surface (bonding interface) of the cylindrical member is cooled to form a large number of crystal nuclei, and the molten copper alloy is simultaneously solidified. In the vicinity of the bonding interface, copper alloy grains having extremely small grain size are simultaneously generated, and the copper alloy grains hinder mutual crystal growth to form chill crystals. When the chill crystals are formed in the vicinity of the bonding surface 21, a concentration of Sn, which is a solute component, decreases toward the bonding surface 21 in the copper alloy 4. This is because crystal nuclei are generated, due to the rapid cooling of the molten copper alloy, in the molten copper alloy in the vicinity of the bonding interface as Cu (composed of Cu), and the copper alloy grains simultaneously solidified in the vicinity of the bonding interface include the crystal nuclei as a main component and thus include a small amount of Sn which is a solute component.

In the method of the present invention, as described above, since a large amount of molten copper alloy is poured onto the inner surface of the cylindrical member (back metal), the molten copper alloy coming into contact with the inner surface (bonding interface) of the cylindrical member is cooled slower than in the conventional method, thereby reducing the formation of crystal nuclei of the copper alloy in the molten copper alloy in contact with the bonding interface. Furthermore, since the molten copper alloy is cooled slower than in the conventional method due to a large amount of poured molten copper alloy, part of the molten copper alloy including the crystal nuclei generated in the vicinity of the bonding interface flows from the bonding interface to another portion before being solidified in the vicinity of the bonding interface, following the rotating inner surface (bonding interface) of the cylindrical member and by centrifugal force applied to the molten copper alloy. Thus, it is possible to prevent the simultaneous generation of a large number of crystal nuclei in the vicinity of the inner surface (bonding interface) and the simultaneous solidification of the molten copper alloy in the vicinity of the interface. Furthermore, the rotational speed is set, as shown in FIG. 5, so that the initial gravity ratio F/Gi is 0.8 to 0.9, the influence of the centrifugal force on the crystal nuclei generated in the vicinity of the bonding interface is reduced, and the crystal nuclei are grown from the bonding interface toward a center of the axis of the cylindrical member to be columnar crystals. Therefore, the copper alloy grains in contact with the bonding interface of the back-metal layer can grow to have an average grain size of 30 μm to 80 μm. Subsequently, cooling water is sprayed to the outer diameter surface side of the cylindrical member to cool the cylindrical member, and while the molten copper alloy is at a temperature of lower than the liquidus temperature and not lower than the solidus temperature, the gravity ratio is varied 3 to 10 times between the end gravity ratio F/Ge and the reference gravity ratio F/Gs. By varying of the gravity ratio (i.e., rotational speed), gravity and varying inertial force and centrifugal force are applied to the molten copper alloy in the process of being solidified. Thus, due to unstable behavior of the molten copper alloy, growth of the columnar crystals in different directions causes growth of the columnar crystals intertwined with each other. Therefore, internal-crystal-inclusive grains including internal crystals are generated in cross-sectional view.

Figure 4:
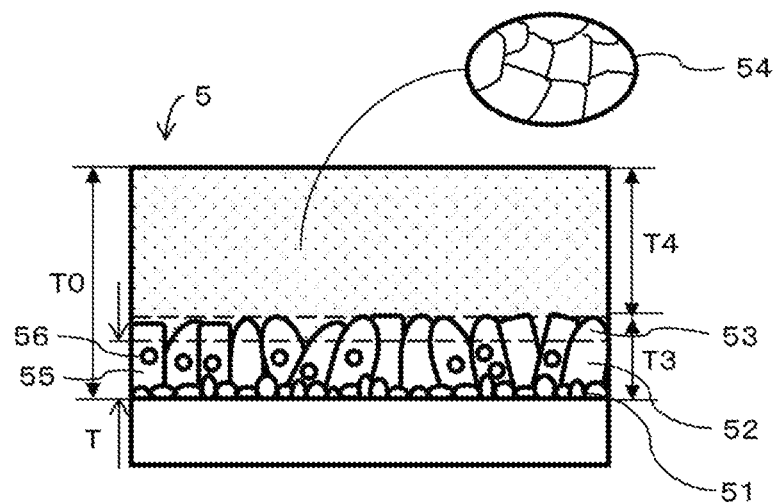
FIG. 4 is a schematic diagram of a copper alloy layer structure after casting of an embodiment of a process of manufacturing a sliding member according to the present invention.

FIG. 4 is a schematic diagram showing a cross-sectional structure of a casted copper alloy layer after cooling. A copper alloy layer 5 includes a grain group 51 that is in contact with an inner surface of a copper alloy part and has an average grain size of 30 μm to 80 μm. The grain group 51 is to be the interface grain group 41G of the sliding layer. On the grain group 51, a columnar crystal structure portion 53 having a large average grain size is formed. In cross-sectional view of the columnar crystal structure portion 53, internal-crystal-inclusive grains 55 are observed. On the columnar crystal structure portion 53, an equiaxed crystal structure portion 54 is formed. The equiaxed crystal structure portion 54 is composed of granular equiaxed crystals having an average grain size smaller than the average grain size of the columnar crystals. When T0 represents a thickness of the copper alloy layer, a thickness T3 of the columnar crystal structure portion 53 is approximately 15 to 35% of T0, and a thickness T4 of the equiaxed crystal structure portion 54 is approximately 60 to 80% of T0.

Next, a portion on a surface (inner surface) side of the copper alloy layer is removed by cutting processing so that the copper alloy layer has the thickness T. Thus, the sliding member 1 is manufactured. The part of the copper alloy layer after cooling is removed by the cutting processing so that the thickness T0 is reduced by at least 90%, and thus the equiaxed crystal structure portion 54 and part of the columnar crystal structure portion 53 are removed. Accordingly, the non-interface grain group 42G of the sliding layer does not include the equiaxed crystal structure portion 54, and includes a remaining part 52 of the columnar crystal structure portion composed of grains having a large average grain size.

Thus, the average grain size D1 of the interface grain group 41G can be 10 to 30% of the average grain size D2 of the non-interface grain group 42G (D1/D2=0.1 to 0.3). In the manufacture of the sliding member 1, the copper alloy layer may be subjected to annealing treatment, for example, at a temperature of 250° C. to 400° C. before or after the cutting processing, in order to eliminate distortion of the copper alloy.

As described above, the amount of molten copper alloy poured into the cylindrical member is not less than 10 times and not more than 25 times the amount required to form a sliding layer having the thickness T of the sliding member. If the amount of poured molten copper alloy is less than 10 times the above amount, a chill crystal portion is formed as described above and shear failure is more likely to occur. Even if no chill crystal portion is formed, when the copper alloy layer after cooling is cut to have the thickness T of the sliding layer, the copper alloy layer may include an equiaxed crystal portion on the sliding surface side. In such a case, the copper alloy grains that are not in contact with the bonding interface has a small average grain size, and thus the effect of the present invention is not obtained, and shear failure may occur at the bonding interface. On the other hand, if the amount of poured molten copper alloy is more than 25 times the above amount, a structure similar to the copper alloy of the sliding layer of the present invention is obtained, but such a structure requires an excessively large number of man-hours for the cutting and causes a sliding member to be expensive, and is thus unfavorable.

If the initial gravity ratio F/Gi is less than 0.8, a small centrifugal force causes an insufficient centrifugal separation effect, and gas, oxide or the like remains in the columnar crystal structure portion 53, leading to generation of cracks due to the pores. On the other hand, if the initial gravity ratio F/Gi is more than 0.9, columnar crystals are less likely to be generated at the bonding interface due to the influence of the centrifugal force, leading to the interface grain group 41G having a small average grain D1. If the interface grain group 41G has an average grain size D1 of less than 30 μm, ductility is excessively low. Thus, when a large external force is applied to the sliding layer 3, cracking (fatigue) occurs at the grain boundary.

If the end gravity ratio F/Ge is less than 40% of the reference gravity ratio F/Gs, a small centrifugal force causes an insufficient centrifugal separation effect, and gas remains in the columnar crystal structure portion 53, leading to generation of cracks due to the pores. If the end gravity ratio F/Ge is more than 70% of the reference gravity ratio F/Gs, the formation of the internal-crystal-inclusive grains 55 is insufficient. Furthermore, if the gravity ratio is not varied between the reference gravity ratio F/Gs and the end gravity ratio F/Ge, the columnar crystals can not grow in different directions and the internal-crystal-inclusive grains 55 are not generated.

Furthermore, if the number of variations between the reference gravity ratio F/Gs and the end gravity ratio F/Ge is less than 3, the above effect is not obtained and cracking (or fatigue) may occur at the grain boundary. On the other hand, if the number of variations is more than 10, a structure similar to the copper alloy of the sliding layer of the present invention is obtained, but such a structure requires an excessively large number of man-hours and causes a sliding member to be expensive, and is thus unfavorable.

EXAMPLES

Samples of Examples 1 to 15 of the sliding member according to the present invention and Comparative Examples 21 to 27 were produced in the following manner. In the production of these samples, a back-metal layer was formed of a cylindrical member of hypoeutectoid steel including 0.2 mass % of carbon. In Examples 1 to 15, a copper alloy having a predetermined composition was melted to obtain a molten copper alloy and poured onto the back-metal layer (inner surface of the cylindrical member) by centrifugal casting process as described above. After casting, the copper alloy layer was subjected to cutting processing, and then subjected to annealing treatment at a temperature of 300° C. for 5 hours to produce a sliding member. The samples were produced to have the same size of an inner diameter of 80 mm, a thickness of 6 mm, and an axial length of 80 mm to be subjected to a sliding test described later.

In a column "Thickness" in Table 1, a column "Sliding layer thickness T (mm)" shows the thickness T of the sliding layer of the samples. In a column "Manufacturing conditions" in Table 1, a column "Amount of poured copper alloy" shows a value M'/M, where M indicates the amount of molten copper alloy required to form a sliding layer having the thickness shown in the column "Sliding layer thickness T (mm)" in Table 1, and M' indicates the amount of molten copper alloy poured onto the inner surface of the cylindrical member during centrifugal casting. In Examples 1 to 15, the amount of poured copper alloy was set to a value of not less than 10 times the amount required to form a sliding layer.

The thickness of the copper alloy layer before the cutting processing was approximately equal to a value obtained by multiplying the thickness shown in the column "Sliding layer thickness T (mm)" by the value shown in the column "Amount of poured copper alloy".

During the pouring of the molten copper alloy, a temperature of the molten copper alloy was higher by 50° C. to 150° C. than a melting point (liquidus temperature) of the copper alloy. In the column "Manufacturing conditions" in Table 1, a column "Molten copper alloy temperature (° C.)" shows a temperature difference of the temperature of the molten copper alloy during the pouring of the molten copper alloy with respect to the liquidus temperature of the copper alloy. For example, "+50" indicates a temperature higher by 50° C. than the liquidus temperature of the copper alloy.

During the pouring of the molten copper alloy, a temperature of the back-metal layer (cylindrical member) was set to be lower by 0 to 50° C. than the temperature of the molten copper alloy. In the column "Manufacturing conditions" in Table 1, a column "Back metal temperature (° C.)" shows a temperature difference of the temperature of the back-metal layer during the pouring of the molten copper alloy as with respect to the temperature of the molten copper alloy.

The rotational speed of the cylindrical member was set so that the "initial gravity ratio F/Gi", which was the ratio between the centrifugal force and the gravity applied to the molten copper alloy immediately after the pouring of the molten copper alloy, was 0.8 to 0.9. After 5 seconds, the rotational speed of the cylindrical member was set so that the "reference gravity ratio F/Gs" was 55. Then, after 10 seconds, cooling water was sprayed to an outer diameter surface side of the cylindrical member to start cooling the cylindrical member. Subsequently, from a time when the molten copper alloy reached the liquidus temperature to a time when the molten copper alloy reached the solidus temperature, the rotational speed of the cylindrical member was changed so that the gravity ratio was varied 10 times between the "end gravity ratio F/Ge" (40 to 70% of the reference gravity ratio F/Gs) and the reference gravity ratio F/Gs. In the column "Manufacturing conditions" in Table 1, a column "Initial gravity ratio (F/Gi)" shows the "initial gravity ratio F/Gi" applied to the molten copper alloy immediately after the pouring of the molten copper alloy of Examples as a ratio between the centrifugal force and the gravity applied to the molten copper alloy immediately after the pouring of the molten copper alloy. In the column "Manufacturing conditions" in Table 1, a column "End gravity ratio (F/Ge)" shows the "end gravity ratio F/Ge" of Examples as a ratio (%) with respect to the reference gravity ratio F/Gs. For example "40%" indicates 40% of the reference gravity ratio F/Gs "55.0".

After the pouring of the molten copper alloy into the cylindrical member, cooling water was sprayed to the cylindrical member at approximately 1 liter/second per 1 cm² to cool the cylindrical member to approximately 400° C. in approximately 20 to approximately 40 seconds.

Among Comparative Examples 21 to 27 shown in Table 1, Comparative Examples 21 to 26 were produced in the same manner as Examples according to the invention. The copper alloy layer was centrifugal cast and then it was subjected to cutting process and annealing treatment at a temperature of 300° C. for 5 hours to produce a sliding member. In Comparative Example 27, the sample was produced by a conventional general sintering process. A copper alloy powder was scattered on a flat plate composed of hypoeutectoid steel, and then subjected to first sintering (810° C.), first rolling and second sintering (810° C.) to produce a multilayer member. Then, the multilayer member was formed into a cylindrical shape to produce a sliding member. The sliding members of Comparative Examples had the same size (an inner diameter of 80 mm, a thickness of 6 mm, and an axial length of 80 mm) as the sliding members of Examples according to the invention.

Cross-sectional structures of the above samples were observed and analyzed by using an FE-SEM (field emission scanning electron microscope) including an EBSD (electron backscatter diffraction) analysis system and an image analysis method as described above.

Table 1 shows analysis results of Examples 1 to 15 and Comparative Examples 21 to 27. In a column "Average grain size" in the Table 1, a column "D1 (interface grains) (μm)" shows the average grain size D1 of interface grains, and a column "D2 (non-interface grains) (μm)" shows the average grain size D2 of non-interface grains. Furthermore, a column "D1/D2 (%)" shows a ratio (D1/D2) in % of the average grain size D1 of the interface grains to the average grain size D2 of the non-interface grains. Also, an area ratio (S0/S2) of the total area S0 of the internal-crystal-inclusive grains to the area S2 of the non-interface grain group is shown in the column "S0/S2 (%)" by percent.

In the column "Thickness" in Table 1, the column "Sliding layer thickness T (mm)" shows the thickness T of the sliding layer, and a column "T1/T (%)" shows a ratio (T1/T) in % of the average thickness T1 of an interface grain group to the thickness T of the sliding layer.

TABLE 1

| Sample No. | Copper alloy Composition (mass %) | Average grain size | | | | Thickness | | Presence of shear failure Conditions A |
|---|---|---|---|---|---|---|---|---|
| | | D1 (interface grains) (μm) | D2 (non-interface grains) (μm) | D1/D2 (%) | S0/S2 (%) | Interface grain group thickness ratio (T1/T) (%) | Sliding layer Thickness T (mm) | |
| 1 | Cu—0.5Sn | 35.2 | 298.2 | 12 | 43 | 8.7 | 0.35 | None |
| 2 | Cu—6Sn | 40.5 | 232.3 | 17 | 51 | 2.8 | 1.25 | None |
| 3 | Cu—6Sn | 46.0 | 239.3 | 19 | 55 | 3.1 | 1.2 | None |
| 4 | Cu—8Sn | 62.5 | 298.4 | 21 | 61 | 5.3 | 1.0 | None |
| 5 | Cu—10Sn | 68.2 | 263.0 | 26 | 68 | 7.9 | 0.8 | None |
| 6 | Cu—10Sn | 73.3 | 311.3 | 24 | 80 | 3.4 | 2.0 | None |
| 7 | Cu—10Sn | 35.8 | 298.3 | 12 | 25 | 7.7 | 0.4 | None |
| 8 | Cu—12Sn | 79.0 | 269.1 | 29 | 52 | 2.6 | 3.0 | None |
| 9 | Cu—6Sn—10Ni—1Fe—0.1P | 68.1 | 288.3 | 24 | 49 | 4.8 | 0.8 | None |
| 10 | Cu—6Sn—1Al—1In—3Ag—1Sb | 72.3 | 284.4 | 25 | 47 | 5.2 | 0.8 | None |
| 11 | Cu—6Sn—10Zn—2Si—3Mn—15Pb | 73.4 | 290.5 | 25 | 48 | 4.7 | 0.8 | None |
| 12 | Cu—10Sn—10Bi—1Fe—0.02P | 70.2 | 296.2 | 24 | 46 | 4.9 | 0.8 | None |
| 13 | Cu—6Sn | 31.0 | 227.3 | 14 | 53 | 2.8 | 1.25 | None |
| 14 | Cu—6Sn | 40.5 | 232.3 | 17 | 26 | 2.8 | 1.25 | None |
| 15 | Cu—10Sn | 69.5 | 306.3 | 23 | 78 | 2.8 | 1.25 | None |
| 21 | Cu—6Sn | 0.8 | (26.8) | — | — | — | 0.8 | Present |
| 22 | Cu—6Sn | 29.1 | 316.3 | 9 | 68 | 3.4 | 0.8 | Present |
| 23 | Cu—10Sn | 28.8 | 306.4 | 9 | 45 | 3.1 | 0.8 | Present |
| 24 | Cu—10Sn | 84.9 | 258.8 | 33 | 70 | 10.6 | 0.8 | Present |
| 25 | Cu—6Sn | 35.5 | 227.3 | 16 | 20 | 2.8 | 1.25 | None |
| 26 | Cu—6Sn | 28.0 | 215.3 | 13 | 0 | 2.5 | 1.05 | Present |
| 27 | Cu—10Sn—10Bi—1Fe—0.02P | 53.5 | 54.4 | 98 | 0 | — | 0.8 | Present |

| Sample No. | Sliding Presence of shear failure Conditions B | Surface Cracking Conditions B | Manufacturing conditions | | | | | |
|---|---|---|---|---|---|---|---|---|
| | | | Amount of poured copper alloy | Molten copper alloy temperature (° C.) | Back metal temperature (° C.) | Initial gravity ratio (F/Gi) | End gravity ratio (F/Ge) | |
| 1 | Present | None | 10 | +50 | −50 | 0.85 | 45 | Examples |
| 2 | Present | None | 15 | +50 | −25 | 0.83 | 65 | |
| 3 | None | None | 15 | +75 | −25 | 0.90 | 56 | |
| 4 | None | None | 15 | +100 | −25 | 0.88 | 59 | |
| 5 | None | None | 15 | +100 | 0 | 0.85 | 63 | |
| 6 | None | None | 15 | +100 | −25 | 0.84 | 40 | |
| 7 | None | None | 10 | +75 | −50 | 0.87 | 70 | |

TABLE 1-continued

| | | | | | | | | |
|---|---|---|---|---|---|---|---|---|
| 8 | Present | None | 25 | +150 | −25 | 0.88 | 55 | |
| 9 | None | None | 20 | +100 | −25 | 0.84 | 64 | |
| 10 | None | None | 20 | +100 | −25 | 0.85 | 48 | |
| 11 | None | None | 20 | +100 | −25 | 0.88 | 49 | |
| 12 | None | None | 20 | +100 | −25 | 0.85 | 50 | |
| 13 | Present | None | 15 | +50 | −25 | 0.80 | 60 | |
| 14 | Present | None | 15 | +50 | −25 | 0.86 | 70 | |
| 15 | Present | None | 15 | +50 | −25 | 0.90 | 40 | |
| 21 | — | Present | 2 | +100 | −25 | 0.85 | 67 | Comparative |
| 22 | — | Present | 7.5 | +100 | −25 | 0.84 | 62 | Examples |
| 23 | — | Present | 15 | +100 | −75 | 0.87 | 49 | |
| 24 | — | Present | 15 | +100 | +25 | 0.88 | 55 | |
| 25 | Present | Present | 15 | +50 | −25 | 0.88 | 80 | |
| 26 | Present | Present | 15 | +50 | −25 | 0.98 | 69 | |
| 27 | — | Present | — | — | — | — | — | |

The samples of Examples and Comparative Examples were subjected to a sliding test with use of a bearing tester under conditions (A) as shown in Table 2. Furthermore, the samples of Examples were also subjected to a sliding test with use of the bearing tester under conditions (B) as shown in Table 3, in which a larger load was applied to the sliding layer.

The samples of Examples and Comparative Examples after the sliding tests were cut in a direction parallel to a circumferential direction and perpendicular to a sliding surface, and observed of the generation of "shear failure" at an interface between the sliding layer and the back-metal layer with use of an optical microscope. In a column "Presence of shear failure" in Table 1, in a column "Conditions A" and a column "Conditions B", "Present" indicates a case where the "shear failure" was observed at the interface between the sliding layer and the back-metal layer of the sliding member after the sliding tests under conditions (A) and (B), and "None" indicates a case where no "shear failure" was observed at the interface after the sliding tests.

Furthermore, the samples of Examples and Comparative Examples after the sliding tests were visually observed for the occurrence of "cracking" on the sliding surface. In a column "Sliding surface cracking" in Table 1, in a column "Conditions B", "Present" indicates a case where "cracking" was observed on the sliding surface after the sliding test under conditions (B), and "None" indicates a case where no "cracking" was observed on the sliding surface after the sliding test.

TABLE 2

| Conditions (A) | |
|---|---|
| Tester | Bearing tester |
| Load | 25 MPa |
| Rotational speed | 600 rpm |
| Operation mode | Repetition of sliding for 0.5 minutes and stop for 5 minutes |
| The number of cycles | 20 times |
| Lubrication oil | VG46 |
| Oil supply amount | 80 cc/min |
| Oil temperature | 50° C. |
| Counter shaft | SUJ2 |
| Counter shaft roughness | 0.1 Ra |

TABLE 3

| Conditions (B) | |
|---|---|
| Tester | Bearing tester |
| Load | 35 MPa |
| Rotational speed | 600 rpm |
| Operation mode | Repetition of sliding for 0.5 minutes and stop for 5 minutes |
| The number of cycles | 20 times |
| Lubrication oil | VG46 |
| Oil supply amount | 80 cc/min |
| Oil temperature | 50° C. |
| Counter shaft | SUJ2 |
| Counter shaft roughness | 0.1 Ra |

As shown in Table 1 of the sliding test under conditions (A), Comparative Examples 21 to 24 showed "shear failure" occurred at the interface between the sliding layer and the back-metal layer. On the other hand, in Examples 1 to 15, did not show "shear failure" at the interface. This is presumably because, as described above, the cross-sectional structures of Examples 1 to 15 perpendicular to the sliding surface of the sliding layer have the average grain size D1 of the interface grains was 30 to 80 μm and was 10 to 30% of the average grain size D2 of the non-interface grains (D1/D2=0.1 to 0.3), and thus the occurrence of shear failure was prevented by the effect already described.

Furthermore, also after the sliding test under conditions (B) in which a larger load was applied to the sliding layer of the sliding member than the conditions (A), Examples 3 to 7 and 9 to 12 in which the average grain size D1 of the interface grains was in the range of 40 to 80 μm and the average thickness (average length from the bonding surface toward the sliding surface) T1 of the interface grain group was in the range of 3 to 8% of the thickness T of the sliding layer (T1/T=0.03 to 0.08), did not show "shear failure" at the interface between the sliding layer and the back-metal layer due to further enhancement of the above effect.

In the structures of Examples 3 to 7 and 9 to 12, the amount of molten copper alloy poured onto the inner surface of the cylindrical member was, as shown in Table 1, in the range of approximately 15 to 20 times the amount required to form a sliding layer having the thickness T, and the temperature of the molten copper alloy during the pouring of the molten copper alloy was higher by approximately 75 to 100° C. than the liquidus temperature of the copper alloy.

After the sliding test under conditions (B), no "cracking" was observed on the sliding surface after the sliding test in the samples having the area ratio (S0/S2) being 25 to 80%.

As shown in Table 1, Examples 1 to 15 did not show "cracking" occurred on the sliding surface in the sliding test under conditions (B). On the other hand, Comparative Examples 21 to 27 showed "cracking" on the sliding surface.

The sample of Comparative Example 21 was produced by a conventional general centrifugal casting method, and the amount of poured molten copper alloy was set to a value corresponding to twice the thickness T of the sliding layer. Thus, as described above, the molten copper alloy coming into contact with the bonding interface of the back-metal layer was rapidly cooled, and a thin film of chill crystals having an excessively small grain size (an average grain size of 0.8 μm) was formed on the bonding interface of the back-metal layer. Therefore, in Comparative Example 21, "shear failure" was observed at the interface between the sliding layer and the back-metal layer of the sliding member after the sliding test under test conditions (A). In the cross-sectional structure of Comparative Example 21, chill crystals which are not in contact with the bonding surface of the back-metal layer were also formed above the copper alloy grain group in contact with the bonding surface of the back-metal layer. In the column "Average grain size" in Table 1, the value in parentheses shown in the column "D2 (non-interface grains) (μm)" indicates an average grain size of grains (grains of a columnar crystal portion above a chill crystal portion and small grains of an equiaxed crystal portion above the columnar crystal portion) except the chill crystals which are not in contact with the bonding surface of the back-metal layer.

In Comparative Example 22, the amount of poured molten copper alloy was set to a value corresponding to 7.5 times the thickness T of the sliding layer. In Comparative Example 23, the amount of poured molten copper alloy was set to a value corresponding to 15 times the thickness T of the sliding layer, and the temperature of the back-metal layer during the pouring of the molten copper alloy was lower by 75° C. than the temperature of the molten copper alloy. Accordingly, the molten copper alloy coming into contact with the bonding interface of the back-metal layer during the pouring of the molten copper alloy was cooled faster than in Examples, leading to insufficient prevention of the simultaneous generation of a large number of crystal nuclei in the vicinity of the bonding interface of the back-metal layer and the simultaneous solidification of the molten copper alloy in the vicinity of the interface. The average grain size D1 of the interface grains was less than 30 μm, and due to excessively low ductility, "shear failure" was observed at the interface between the sliding layer and the back-metal layer of the sliding member after the sliding test under conditions (A). Furthermore, the average grain size D1 of the interface grains was less than 10% of the average grain size D2 of the non-interface grains. Due to an excessively large difference in deformation resistance between the average grain sizes D1 and D2, shear failure (cracking) was also observed in the vicinity of an interface between the interface grain group and the non-interface grain group.

In Comparative Example 24, the temperature of the back-metal layer was higher by 25° C. than the temperature of the molten copper alloy during the pouring of the molten copper alloy. Thus, the molten copper alloy coming into contact with the bonding interface of the back-metal layer during the pouring of the molten copper alloy was cooled slower than in Examples. The average grain size D1 of the interface grains exceeded 80 μm, and thus deformation resistance of the interface grain group was excessively low. Furthermore, the average grain size D1 of the interface grains exceeded 30% of the average grain size D2 of the non-interface grains, and thus a difference in deformation resistance between the average grain sizes D1 and D2 was also excessively small. Therefore, "shear failure" was observed at the interface between the sliding layer and the back-metal layer of the sliding member after the sliding test under conditions (A).

In Comparative Example 25, the average grain size D1 of the interface grains was 30 to 80 μm and was 10 to 30% of the average grain size D2 of the non-interface grains (D1/D2=0.1 to 0.3) in the cross-sectional structure perpendicular to the sliding surface of the sliding layer. Thus, no "shear" occurred at the interface between the sliding layer and the back-metal layer of the sliding member after the sliding test. However, the ratio (S0/S2) of the total area S0 of the internal-crystal-inclusive grains to the total area S2 of the non-interface grains was less than 25%. Thus, elastic deformation of the non-interface grain group was not prevented, and cracking occurred on the sliding surface after the sliding test under conditions (B).

In Comparative Example 26, the temperature of the molten copper alloy and the temperature of the back-metal layer during the pouring of the molten copper alloy were appropriate. However, the initial gravity ratio F/Gi was not less than 0.9, leading to insufficient prevention of the simultaneous generation of a large number of crystal nuclei in the vicinity of the bonding interface of the back-metal layer and the simultaneous solidification of the molten copper alloy in the vicinity of the interface. The average grain size D1 of the interface grains was less than 30 μm, and "shear failure" was observed, due to excessively low ductility, at the interface between the sliding layer and the back-metal layer of the sliding member after the sliding test under conditions (A).

In Comparative Example 27, the sample was produced by a conventional general sintering method. The average grain size D1 of the interface grains was approximately the same as the average grain size D2 of the non-interface grains, and D1 was 98.3% of D2. Thus, there was almost no difference in deformation resistance between the average grain sizes D1 and D2. Therefore, "shear failure" was observed at the interface between the sliding layer and the back-metal layer of the sliding member after the sliding test under conditions (A).

The invention claimed is:

1. A sliding member comprising:
   a back-metal layer having a back surface and a bonding surface; and
   a sliding layer on the bonding surface of the back-metal layer, the sliding layer having a sliding surface,
   wherein the back-metal layer comprises an Fe alloy,
   wherein the sliding layer comprises a copper alloy comprising 0.5 to 12 mass % of Sn and the balance of Cu and inevitable impurities,
   wherein the sliding member has a cross-sectional structure perpendicular to the sliding surface, the cross-sectional structure comprising first copper alloy grains that are in contact with the bonding surface and second copper alloy grains that are not in contact with the bonding surface,
   wherein the first copper alloy grains have an average grain size D1 and the second copper alloy grains have an average grain size D2, and D1 and D2 satisfy the following relations:
   D1 is 30 to 80 μm; and
   D1/D2 =0.1 to 0.3,
   wherein, in the cross-sectional structure, the second copper alloy grains comprise third grains, each of which includes internal grains and another grain portion therein, and the internal grains are not in contact with grain boundaries of the each of the third grains, and wherein a total area S0 of the third grains and a total area S2 of the second copper alloy grains satisfy the following relation:

S0/S2=0.25 to 0.80.

2. The sliding member according to claim 1, wherein the second copper alloy grains are columnar crystals in shape.

3. The sliding member according to claim 1, wherein the average grain size D1 of the first copper alloy grains is 40 to 80 μm.

4. The sliding member according to claim 1, wherein an average thickness T1 of the first copper alloy grains is 3 to 8% of a thickness T of the sliding layer.

5. The sliding member according to claim 1, wherein a thickness T of the sliding layer is 0.4 to 2.0 mm.

6. The sliding member according to claim 1, wherein the copper alloy further includes one or more elements selected from 0.01 to 0.2 mass % of P, 0.1 to 15 mass % of Ni, 0.5 to 10 mass % of Fe, 0.01 to 5 mass % of Al, 0.01 to 5 mass % of Si, 0.1 to 5 mass % of Mn, 0.1 to 10 mass % of Zn, 0.1 to 5 mass % of Sb, 0.1 to 5 mass % of In, 0.1 to 5 mass % of Ag, 0.5 to 25 mass % of Pb, and 0.5 to 20 mass % of Bi.

7. The sliding member according to claim 1, wherein the back-metal layer has a composition including 0.07 to 0.35 mass % of C, not more than 0.4 mass % of Si, not more than 1 mass % of Mn, not more than 0.04 mass % of P, not more than 0.05 mass % of S, and the balance of Fe and inevitable impurities.

\* \* \* \* \*